United States Patent [19]
Ferri et al.

[11] 4,113,648
[45] Sep. 12, 1978

[54] TERBIUM-ACTIVATED RARE EARTH OXYSULFIDE PHOSPHORS WITH CONTROLLED DECAY

[75] Inventors: John L. Ferri, Towanda; James E. Mathers; Ramon L. Yale, both of Ulster, all of Pa.

[73] Assignee: GTE Sylvania Incorporated, Stamford, Conn.

[21] Appl. No.: 525,589

[22] Filed: Nov. 20, 1974

[51] Int. Cl.$^2$ .............................................. C09K 11/46
[52] U.S. Cl. .............................................. 252/301.4 S
[58] Field of Search ................................. 252/301.4 S

[56] References Cited

U.S. PATENT DOCUMENTS

| 2,979,467 | 4/1961 | Keller | 252/301.4 S |
| 3,418,247 | 12/1968 | Yocom | 252/301.4 S |
| 3,705,858 | 12/1972 | Luckey et al. | 252/301.4 S |
| 3,725,704 | 4/1973 | Buchanan et al. | 252/301.4 S X |
| 3,738,856 | 6/1973 | Masi | 252/301.4 S X |

FOREIGN PATENT DOCUMENTS 1,817,790  11/1971  Fed. Rep. of Germany .... 252/301.4 S

OTHER PUBLICATIONS

Otomo et al., "Chem. Abstracts," vol. 77, 1972, p. 41270w.

*Primary Examiner*—Jack Cooper
*Attorney, Agent, or Firm*—Donald R. Castle

[57] ABSTRACT

Europium and ytterbium when added to terbium-activated rare earth phosphors having either a lanthanum oxysulfide, gadolinium oxysulfide, or yttrium oxysulfide host increase the decay period of the phosphors in a controlled manner.

3 Claims, No Drawings

4,113,648

TERBIUM-ACTIVATED RARE EARTH OXYSULFIDE PHOSPHORS WITH CONTROLLED DECAY

BACKGROUND OF THE INVENTION

1. Field of the Invention

This invention relates to terbium-activated rare earth oxysulfide phosphors. More particularly it relates to terbium-activated rare-earth oxysulfide phosphors having closely-controlled decay characteristics.

2. Prior Art

The luminescent properties of rare earth oxysulfide phosphors are known. They are used in a variety of uses, for example, in color television, X-ray, and the like. In some instances these materials have decay characteristics which, if altered, could broaden their field of use. It is believed that materials of the rare-earth oxysulfide phosphor type which contain an additive that enables the decay characteristics to be changed in a controlled manner, would be an advancement in the art.

OBJECTS AND SUMMARY OF THE INVENTION

It is an object of this invention to provide a terbium-activated rare-earth oxysulfide phosphor having improved properties.

It is an additional object of this invention to provide a method for controlling the decay characteristics of a rare-earth oxysulfide phosphor.

It is still another object to provide a terbium-activated rare-earth oxysulfide phosphor containing controlled amounts of a rare-earth selected from the group consisting of ytterbium and europium.

These and other objects of this invention are achieved in one aspect by providing a composition consisting essentially of from about 0.0005 to about 0.1 moles of terbium per mole of a host selected from the group consisting of lanthanum oxysulfide, gadolinium oxysulfide, yttrium oxysulfide, and mixtures thereof, and as a decay deaccelerator from an effective amount to about 500 parts by weight per million of ytterbium or europium.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above description of some of the aspects of the invention.

In the manufacture of rare earth oxysulfide phosphors seldom are the raw materials 100% pure. It has been discovered that ytterbium and europium increase the decay in a controlled manner of terbium-activated rare-earth oxysulfide phosphors, therefore it is preferred to start with raw materials having a known concentration of ytterbium and europium and thereafter add an appropriate amount of either ytterbium or europium to give the decay characteristics that are desired for the particular phosphor usage. Amounts of ytterbium and europium as small as 1 ppm have in some instances been found to appreciably effect the decay characteristics of the terbium-activated lanthanum, gadolinium, and yttrium oxysulfide phosphors. Therefore, the amount of decay deaccelerator selected from ytterbium and europium will be dependent upon the decay period that is desired. Effective amounts have been found to be as great as 500 parts per million. Above about 500 parts per million the luminescent characteristics of the phosphor are drastically altered, therefore from about 10 to 100 parts by weight per million parts by weight of host are preferred for most types of usage. The decay characteristics of the beforementioned phosphors are changed by this invention when excited by various media such as charged material particles and high energy photons, such as from X-rays and the like and low energy photons, such as long and short wave ultraviolet light. Therefore, the additives are useful for a wide range of excitation media.

The method of adding the decay deaccelerators that has been found to be most practical has been to add a controlled amount of a source of the ytterbium and europium (as oxides) into a portion of the rare-earth oxide that is used to prepare the host. Then additional amounts of the corresponding rare-earth oxide and containing either no ytterbium or europium or known amounts of ytterbium or europium less than 10 parts per million but contain the proper activation level of terbium oxide to serve are added prior to the conversion of the two oxide raw materials to the terbium-activated rare-earth oxysulfide. The level of terbium can be from about 0.0005 moles to about 0.1 moles per mole of host although an amount of from about 0.0025 to about 0.01 is preferred. For example, the oxides of ytterbium and europium can be added to a lanthanum oxide to yield a 1000 parts per million of ytterbium or europium thereafter a 50—50 by weight blend with a lanthanum-oxide which does not contain ytterbium or europium but contains twice the desired activator level can be used to yield a decay deaccelerator level of 500 parts per million in the finished terbium-activated lanthanum-oxide sulfide phosphor. If smaller amounts of the ytterbium or europium are desired, then larger amounts of the europium and ytterbium-free material will be used to give a proper blend of raw materials. The conversion of rare-earth oxides to rare earth oxysulfides is conducted by procedures well known to those in the art, therefore, the procedures will not be discussed in detail herein.

To more fully explain the subject invention the following detailed samples are presented. All parts, proportions, and percentages are by weight unless otherwise indicated.

EXAMPLE 1

The following materials are blended together to form a relatively uniform admixture:
32.419 parts $La_2O_3$
0.187 parts $Tb_4O_7$
11.200 parts S
12.720 parts $Na_2CO_3$
2.84 parts $Na_2HPO_4$ After the above compounds are blended the admixture is placed in a covered crucible, and heat treated for two hours at 1200° C. After removing soluble components by water washing, the resultant phosphor exhibits a green emission when excited by X-rays. Decay values for the resulting phosphor are listed in Table 1 and 2 as 0 ppm of additive.

EXAMPLE 2

Example 1 is repeated except with the addition of amounts of Yb (as $Yb_2O_3$) to yield 50, 100, and 500 ppm of Yb in the phosphor. The phosphors produced have a decay longer than the phosphor of Example 1. Decay values are listed in Table 1.

EXAMPLE 3

Example 1 is repeated except various amounts of Eu (as $Eu_2O_3$) are added to yield 50, 100, and 500 ppm of Eu in the phosphor. The phosphors have a decay longer than the phosphor of Example 1. Decay values are listed in Table 2.

EXAMPLE 4

Following essentially the same procedure as in Example 1 except instead of $La_2O_2S$:Tb, a $Gd_2O_2S$:Tb phosphor is made. Various levels of Eu (as $Eu_2O_3$) are added as in Example 3 and the decay increases with increasing amounts of Eu, as shown in Table 3.

Table 1

| $La_2O_2S$:Tb | ppm Yb | x-ray decay[1] |
|---|---|---|
| 0 | | $6.3 \times 10^{-5}$% (5 sec.) |
| | 50 | $1.5 \times 10^{-4}$% |
| | 100 | $3.7 \times 10^{-4}$% |
| | 500 | $9 \times 10^{-4}$% |

[1]Expressed as % of control sample at full excitation.

Table 2

| $La_2O_2S$:Tb | ppm Eu | x-ray decay[1] |
|---|---|---|
| 0 | | $1 \times 10^{-6}$% (30 sec.) |
| | 10 | $1.3 \times 10^{-4}$% |
| | 50 | $1.9 \times 10^{-4}$% |
| | 100 | $2.5 \times 10^{-4}$% |
| | 500 | $5 \times 10^{-4}$% |

[1]Expressed as % of control sample at full excitation.

Table 3

| $Gd_2O_2S$:Tb | ppm Eu | x-ray decay[1] |
|---|---|---|
| 0 | | $4 \times 10^{-3}$% (30 sec.) |
| | 1 | $4.3 \times 10^{-3}$% |
| | 5 | $5 \times 10^{-3}$% |
| | 10 | $7 \times 10^{-3}$% |
| | 15 | $8 \times 10^{-3}$% |

[1]Expressed as % of control sample at full excitation.

Substantially similar results in longer decay are achieved by adding ytterbium and europium to a terbium-activated yttrium oxysulfide phosphor.

The following method is used for measuring decay given in Tables 1, 2, and 3.

PERSISTENCE MEASUREMENT OF X-RAY EXCITED RARE EARTH OXYSULFIDES

One method used to measure decay in the foregoing X-ray phosphor is a technique using a General Electric portable industrial X-ray unit as the excitation source and a Gamma Model 2900 Auto-Photometer coupled to a Beckman 10-inch recorder as the measuring device.

The General Electric Portable Industrial X-Ray Unit used is a Model LX-140. It operates at a fixed X-ray tube current of 2 ma and variable accelerating voltage from 70 to 140 kilovolts. The unit is housed in a 24 × 24 × 48 inch high lead-lined cabinet with safety interlock switches connected to the external control unit.

The Gamma Scientific Model 2900 Auto-Photometer is coupled to a S-11, end-on photomultiplier tube. An auxiliary output signal is fed to a Beckman 10-inch recorder which has full scale deflection of less than 0.5 second. The recorder has seven speeds — 0.1, 0.2, 0.5, 1, 2, 5, and 10 inches per minute.

The phosphor is placed in a 1.3-cm hole in a 2.3-mm thick brass holder which is covered on one side by a plastic tape. The phosphor is spatulated smooth with the surface of the holder. The holder is placed on a stage located approximately 18-cm below the center line of the X-ray tube. This position is also approximately 9-cm below a 20-mm aluminum filter that intercepts the X-ray beam and simulates the density of the human body.

The light emitted by the phosphor is picked up by a filter optic probe located about 1 cm from the surface of the phosphor and fed through a port in the side of the cabinet to the photomultiplier tube. The fiber optic is connected to the photomultiplier through an adapter that allows the use of various filters used in the measurement of color, brightness, and persistence.

In the measurement of persistence, a "standard" phosphor sample is placed on the stage. A 1 log neutral density filter is placed in the holder and, with the shutter open, the sample is excited for 10 sec. at 80 KVP (kilovolts peak). The resultant emission level is adjusted to nearly full scale chart deflection with the range switch on "Auto" and the indicator reading "0" scale by adjusting the phototype anode voltage. Next, the 1 log N.D. filter is replaced by a 0.0 log N.D. filter and subsequent samples are excited for 10 seconds with the phototube shutter closed. As soon as the X-ray tube kicks off, the phototube shutter is opened and with the recorder set at 5 inches/minute, a trace is made at the resultant decaying emission. The average persistence is recorded for one minute. The recorder trace is then measured to 10, 20, 30, etc., seconds after "cutoff" and the signal height measured at these points. The persistence is then recorded as the "Percent of Standard at Full Excitation at a Specified Time Increment, i.e., 30 sec."

While there has been shown and described what are at present considered the preferred embodiments of the invention, it will be obvious to those skilled in the art that various changes and modifications may be made therein without departing from the scope of the invention as defined by the appended claims.

What is claimed is:

1. A phosphor composition consisting essentially of a host selected from the group consisting of lanthanum oxysulfide, gadolinium oxysulfide, yttrium oxysulfide, and mixtures thereof and, as an activator, from about 0.0005 to about 0.1 moles of terbium per mole of host and from 1 ppm to about 500 parts by weight per million parts by weight of host of a decay deaccelerator selected from the group consisting of ytterbium and europium.

2. A phosphor composition according to claim 1 wherein said decay deaccelerator is from about 10 to about 100 parts by weight per million parts by weight of host.

3. A phosphor composition according to claim 2 wherein said terbium-activator content is from about 0.0025 to about 0.01 moles per mole of host.

* * * * *